Sept. 9, 1958 S. MACHLIN 2,851,593

PLURAL-BAND DUAL-TURRET TUNER WITH MASKED-NUMBER DECADE TYPE INDICATOR

Filed March 10, 1954 4 Sheets-Sheet 1

INVENTOR.
STUART MACHLIN
BY
Ostrolenk & Faber
ATTORNEYS

INVENTOR.
STUART MACHLIN
BY
Ostrolenk & Faber
ATTORNEYS

INVENTOR.
STUART MACHLIN
BY
Ostrolenk & Faber
ATTORNEYS

Sept. 9, 1958 S. MACHLIN 2,851,593

PLURAL-BAND DUAL-TURRET TUNER WITH MASKED-NUMBER DECADE TYPE INDICATOR

Filed March 10, 1954 4 Sheets-Sheet 4

INVENTOR.
STUART MACHLIN

BY

Ostrolenk & Faber
ATTORNEYS 2,851,593

PLURAL-BAND DUAL-TURRET TUNER WITH MASKED-NUMBER DECADE TYPE INDICATOR

Stuart Machlin, Huntington, N. Y., assignor to Standard Coil Products Co., Inc., Los Angeles, Calif., a corporation of Illinois Application March 10, 1954, Serial No. 415,379

8 Claims. (Cl. 250—20)

My present invention relates to television input tuners and more particularly it relates to input tuners for reception of both U. H. F. and V. H. F. channels of the television band.

In previous types of turret tuners for reception of V. H. F. and U. H. F. channels, for example, the one described in Patent No. 2,777,354, which issued November 27, 1956, assigned to the same assignee as the present case, during U. H. F. reception the U. H. F. oscillator was made to oscillate at a certain preselected number of frequencies, each of these frequencies determining one of the bands in which the U. H. F. range could be arbitrarily divided. The U. H. F. oscillator was made to oscillate at frequencies lower than the frequencies of the incoming signals. For example, if channel 23 of the U. H. F. range was desired, the low frequency oscillator would first be switched to oscillate at 350 megacycles, the radio frequency signal being between 524–530 megacycles.

After the mixing operation, a signal having a frequency of 174–180 megacycles will be obtained. This signal is picked up by the V. H. F. panel corresponding to that particular V. H. F. frequency. For example, in the case of a first I. F. of 174–180 megacycles, the V. H. F. channel used would be channel 7.

The advantage in using this system of double modulation permitting the utilization of the V. H. F. turret in addition to the U. H. F. turret is quite clear, but it was found that when this U. H. F.–V. H. F. tuner is tuned for reception of U. H. F. channel 23, interference is produced by the second harmonic of the U. H. F. oscillator.

In fact, while it was previously shown that a frequency of 524 megacycles corresponding to channel 23 minus the oscillator frequency of 350 megacycles gives the V. H. F. frequency of 174 megacycles corresponding to channel 7, it will also be apparent that when the second harmonic of the U. H. F. oscillator corresponding to a frequency of 700 megacycles mixes with the incoming signal of 524 megacycles, there will be produced by subtraction of the 524 megacycle frequency from the 700 megacycle frequency another V. H. F. frequency of 176 megacycles also corresponding to V. H. F. channel 7, V. H. F. channel 7 consisting, in fact, of the band located between 174 megacycles and 180 megacycles.

This interference produced at the receiver itself and caused by the second harmonic of the local U. H. F. oscillator can produce considerable distortion and is caused essentially by the fact that the U. H. F. oscillator operates at a frequency lower than the frequency of the incoming U. H. F. signal, in the above case the U. H. F. oscillator being 350 megacycles while the incoming signal having a frequency of 524–530 megacycles. The same interference will be obtained also at channel 38.

To overcome such a disadvantage, it is then necessary to have a U. H. F. oscillator capable of oscillating at a frequency always above the frequency of the incoming U. H. F. signal by the magnitude of the V. H. F. intermediate frequency which means that the U. H. F. oscillator when using a system similar to the one described in the previously mentioned application will have to oscillate between a low value of 650 megacycles and a high value of 1,022 megacycles, considerably higher than the frequency at which the U. H. F. oscillator had to oscillate in the above-mentioned application, 290 to 710 megacycles.

This difficulty may be obviated by making the U. H. F. oscillator oscillate at frequencies higher than the incoming television frequencies for the lower channels, for example, up to channel 49 and to have the U. H. F. oscillator oscillate at frequencies lower than the frequencies of the incoming signals at the higher channels from 50 up.

By this means it becomes then impossible for any interference of the kind described above to occur at both the low frequency and the high frequency channels, in other words, in the whole U. H. F. range from channel 14 to channel 83.

One of the objects of my present invention is, therefore, a U. H. F.–V. H. F. television input tuner having no second harmonic interference.

When my novel system is used in television input tuners, it is found that while as in the previously mentioned application the knob corresponding to the U. H. F. turret may be rotated always in one direction to go from U. H. F. band 1 to U. H. F. band 8, it will be necessary to rotate the V. H. F. knob counterclockwise for selecting channels above 50 and clockwise for selecting channels between channel 14 and 49, inclusive.

It is thus seen that if a U. H. F. oscillator oscillates in certain bands at frequencies lower than the incoming television frequencies and in some bands at frequencies higher than the frequencies of the incoming television signals, the knobs used for selecting the desired U. H. F. channel will have to give the correct visual indication of the channel number selected regardless of whether the channel selected is between channel 14 and 49 or between channel 50 and 83.

My present invention provides, in fact, a system of knobs in which both V. H. F. and U. H. F. channels may be selected with great ease since my novel knob system consists essentially of a mask located over an illuminating device, the mask having a number of openings.

On this mask are also placed in a suitable manner the eight indicating numbers of the U. H. F. bands. The mask rotates with a shaft carrying the U. H. F. turret. Over this mask is the V. H. F. knob having three sets of numbers in circles of decreasing radii so that the combination of numbers of the U. H. F. mask with the numbers on the V. H. F. knob produces the desired U. H. F. or V. H. F. channel.

Accordingly, another object of my present invention is a knob system for U. H. F.–V. H. F. input tuners capable of giving a visual indication of the V. H. F. or U. H. F. channel selected.

Another object of my present invention is a knob system of simple and inexpensive construction.

I have found furthermore that in order to avoid considerable stress on the bearings of the shafts of the U. H. F. or V. H. F. turrets caused by the V. H. F.–U. H. F. switch described in the above-mentioned application, it is possible to construct the cam mechanism so that it is located inside a similarly shaped element having a lip around it so that the switch roller engaged between the lip and the cam would always produce practically no stress on the bearings of the U. H. F.–V. H. F. turrets.

The importance of this novel cam will be further appreciated if it is pointed out that such a pressure on the shafts of the turrets may cause the complete bending of the wire springs holding the turrets in place in their bearings.

Another object of my present invention is, therefore, a U. H. F.–V. H. F. switch producing no pressure at the bearings of the U. H. F.– V. H. F. turrets.

The foregoing and many other objects of my invention will become apparent in the following description and drawings in which:

Figure 1 is a partly schematic view of my novel television input tuner.

Figure 2 is a circuit diagram corresponding to Figure 1 showing my novel input tuner in its U. H. F. position.

Figures 5, 6, 7, 8, 9, 10:
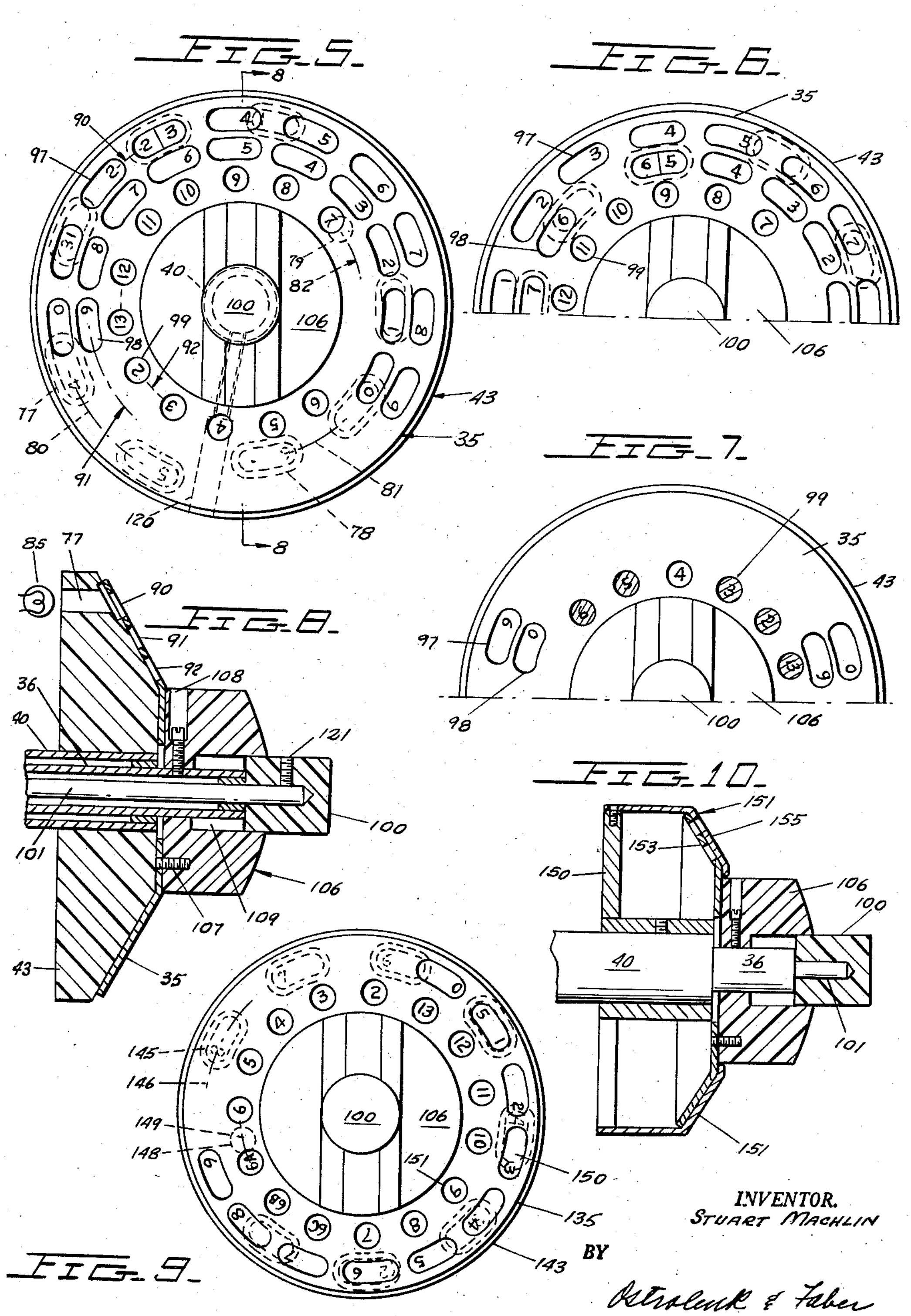

Figure 5 is a front view of my novel knob system in the U. H. F. position.

Figure 6 is a front view of my novel knob system in another U. H. F. position.

Figure 7 is another front view of my novel knob system in its V. H. F. position.

Figure 8 is a cross-sectional view of my novel knob system taken on line 8—8 of Figure 5 looking in the direction of the arrows.

Figure 9 is another embodiment of my novel U. H. F.–V. H. F. knob.

Figure 10 is still another embodiment of my novel U. H. F.–V. H. F. knob system.

Figure 1:
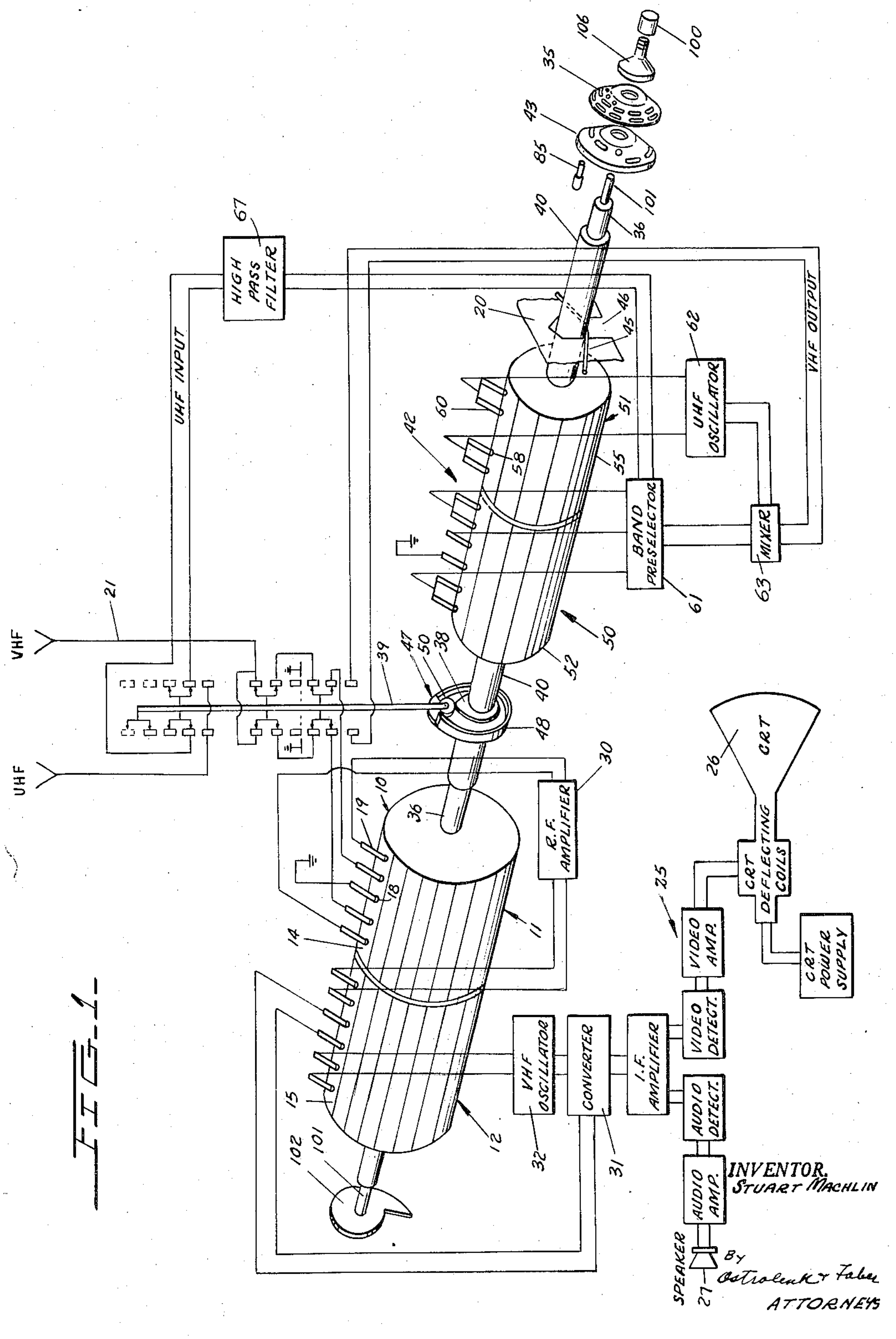
Figure 2:
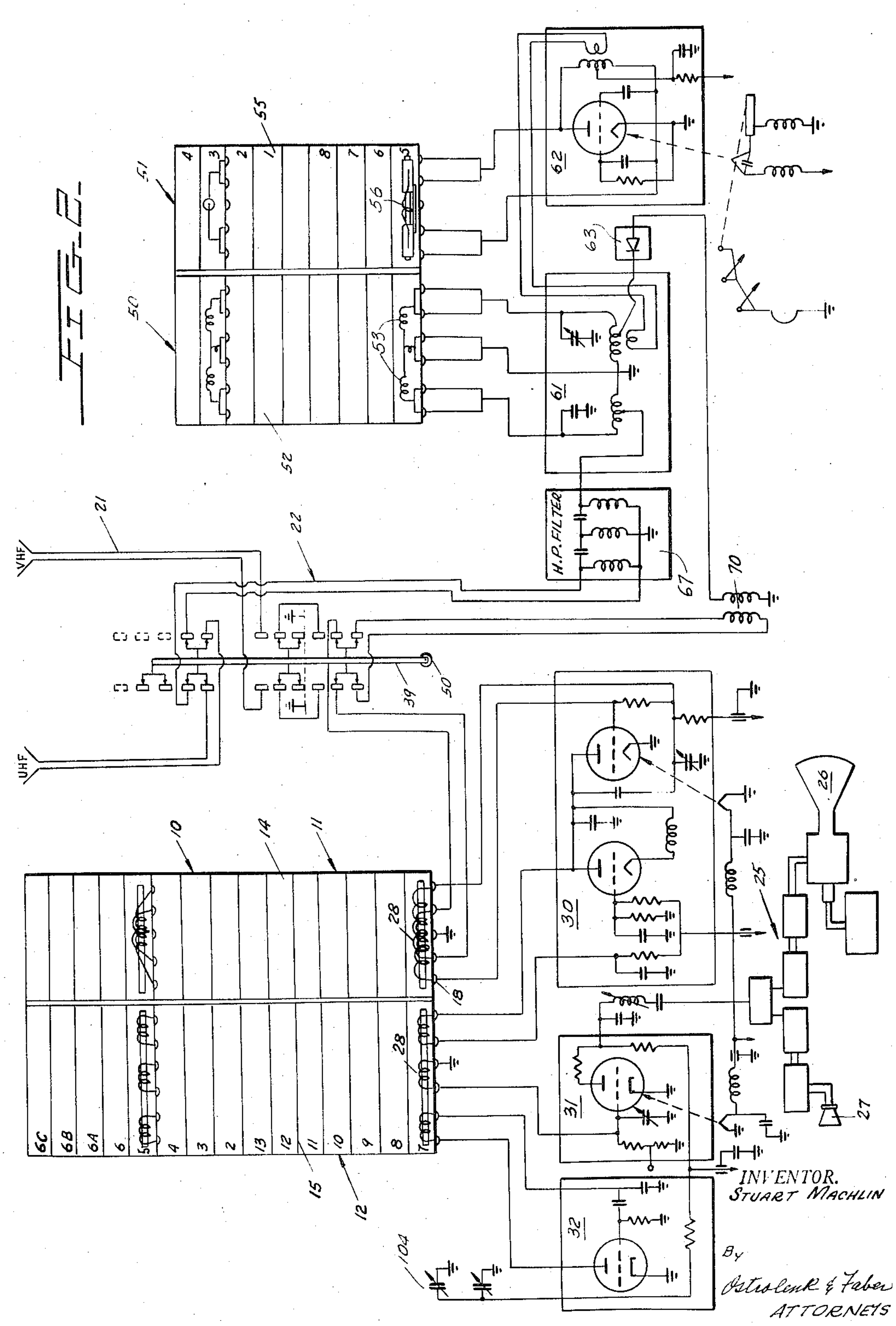

Referring to Figures 1 and 2 showing, respectively, the mechanical and the electrical configuration of the turret tuner employing my novel system, V. H. F. turret 10, similar to the one described in the above-mentioned patent consists of an antenna section 11 and an oscillator-converter section 12. Section 11 comprises fifteen panels 14, section 12, fifteen panels 15 corresponding to the presently existing twelve V. H. F. channels plus three additional V. H. F. positions which in the present embodiment are between V. H. F. channel 6 and 7 and referred to as 6A, 6B and 6C.

Panels 14 and 15 are provided with appropriate contacts 18 for engaging an equal number of stationary contacts 19 mounted on the chassis, a portion of which, 20, is shown in Figure 1.

V. H. F. turret 10 is connected through panels 14 to its antenna 21 when switch 22 is in its V. H. F. position (see Figure 1), and the output from V. H. F. turret 10 tuner is applied through well-known television receiver circuits 25 to operate a cathode ray picture tube 26 and a speaker 27.

On panels 14 and 15 are mounted electrical components 28 which may be connected successively through contacts 18 and 19 to circuits 30, 31 and 32 causing these circuits to operate at a preselected frequency corresponding to the particular set of panels 14, 15 connected to the antenna 21 and the circuits 30, 31 and 32 through contacts 18 and 19.

For the position shown in Figure 1, for example, signals having a V. H. F. of 174–180 megacycles and corresponding to channel 7 are received and amplified by the R. F. cascode amplifier 30 through antenna 21 and applied to converter 31, while at the same time oscillator 32, the output of which is also connected to converter 31, is made to oscillate at a frequency such that the output from converter 31 is at the I. F. frequency of the television set, e. g. 25 megacycles.

The I. F. signals are then applied to the remaining television receiver circuits 25 causing the desired picture signals to appear at the cathode ray tube 26 and speaker 27.

If it is desired to select any other V. H. F. channel, the operator need only turn the V. H. F. knob 35 which through shaft 36 causes turret 10 to rotate with respect to stationary contacts 19.

Figure 3A:
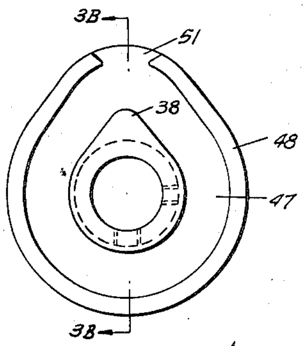
Figure 3A is a front view of my novel cam mechanism.
Figure 3B:
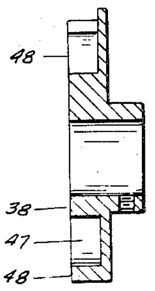
Figure 3B is a cross-sectional view taken on line B—B of Figure 3A looking in the direction of the arrows.

During V. H. F. reception, switch 22 must be maintained at the position shown in Figure 1. Operation of switch 22 is made through a cam 38 having as its cam follower the shaft 39 of switch 22. Cam 38 is secured on the shaft 40 of U. H. F. turret 42. Shaft 40 and, therefore, turret 42 and cam 38 are rotated by means of another knob 43, which in the present embodiment is actually a mask, as described hereinafter in connection with Figures 3, 4 and 5.

As shown in Figure 1, turrets 10 and 42 are held in place in chassis 20 by means of wire springs 45 which serve to keep shafts 36 and 40 in their V-shaped openings 46 of chassis 20. It is obvious that if a spring is used to bias cam follower 39 toward cam 38, considerable stress will be applied to the wire springs 45 through shafts 36 and 40 causing them to distort to the front when they become unable to retain shafts 36 and 40 in close engagement with V-shaped bearings 46 of chassis 20.

To overcome this difficulty (see also Figures 3A and 3B) I have provided cam 38 with a similarly shaped member 47 having a lip 48 surrounding cam 38. Shaft 39 of switch 22 is provided with a roller 50 secured to shaft 39 in any suitable way where roller 50 has radial dimensions equal to the distance between cam 38 and lip 48. Lip 48 is intercepted at 51 to permit passage and movement of shaft 39 in member 47.

By this means lip 48 and cam 38 cooperate to move shaft 39 without any need for springs or other resilient means, always keeping roller 50 in close engagement with cam 38 and, therefore, follow continuously cam 38.

Figure 4:
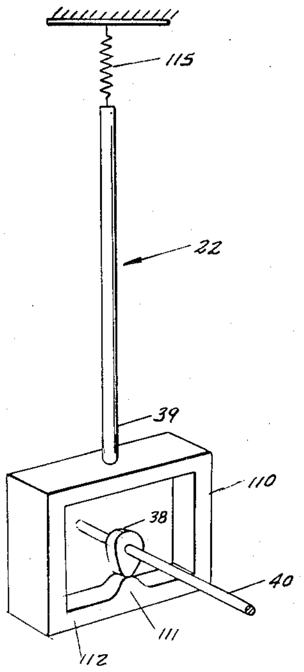
Figure 4 is a modification of the cam mechanism of Figure 3A.

In Figure 4 I have shown another embodiment of my novel cam 38. In this second embodiment, shaft 39 of switch 22 is provided with an approximately rectangularly shaped member 110 having inwardly protruding portion 111 in the side 112 of member 110 directly opposite to shaft 39. Cam 38 is mounted on shaft 40 of U. H. F. turret 42 as previously described, but shaft 39 of switch 22 is biased in the upward direction by means of spring 115.

Spring 115 makes possible the continuous engagement between cam 38 and protruding portion 111 of member 110, thus causing the perfect operation of switch 22 by means of cam 38 through shaft 40 and operation of knob 43 (see Figure 1).

If the embodiment shown in Figure 4 is applied in the input tuner described in the above-mentioned application and as can be seen in Figure 1, all of the pressure previously applied on wire springs 45 by switch 22 has been compensated for. Actually, spring 115 may be so selected as to actually help the biasing action of wire springs 45 as can be easily appreciated by comparing Figure 4 with Figure 1.

As previously mentioned, cam 38 and member 47 are mounted on the same shaft 40 of U. H. F. turret 42 operated by knob 43. U. H. F. turret 42 consists also of two sections, the band preselector section 50 and the oscillator section 51. Section 50 consists of panels 52 carrying circuit elements 53 (see Figure 2), while oscillator section 51 is provided with panels 55 carrying electrical components 56 (see Figure 2). Each panel 52 and 55 has contacts 58 which engage stationary contacts 60. Stationary contacts 60 are connected to circuits 61, 62 and 63 mounted on chassis 20.

When a U. H. F. channel is desired, for example channel 23, knob 43 is turned to the position having decade number 2. This causes shaft 39 of switch 22 to take the position shown in Figure 2 and connect the U. H. F. antenna 65 into the band preselector 61 through high pass filter 67. Band preselector 61 will pass only frequencies in the range of frequency corresponding to channels 20–29, inclusive, because of the particular components 53 mounted on the preselector panel 52 corresponding to position 2 of U. H. F. knob 43.

At the same time, the correct panel 55 of oscillator section 51 is so positioned that the electrical component 56 mounted on it is connected to U. H. F. oscillator 62, causing it to oscillate at a frequency (722 megacycles in this example) higher than that of the incoming U. H. F. signal, 524–530 megacycles for channel 23.

Oscillator 62 will preferably be of the incremental tuning type as described in application Serial No.276,565, filed March 14, 1952, now Patent No. 2,785,297, issued March 12, 1957.

As a result of the mixing operation between the incoming signals having frequencies between 506 megacycles and 566 megacycles and the oscillator frequency of 722 megacycles occurring at mixer 63, signals having V. H. F. frequencies of from 156 to 216 megacycles will appear across transformer 70.

If now V. H. F. knob 35 is turned to three of the U. H. F. digit numbers corresponding to position 10 in V. H. F., only signals between 174 and 180 megacycles will be amplified at 30 and through circuits 31, 32 and 25 will operate cathode ray tube 26 and speaker 27.

In the present embodiment, U. H. F. turret 50 has nine positions since the U. H. F. range was arbitrarily divided into eight bands and the 9th position corresponds to V. H. F. reception.

To select a different channel, for example 25, it is now only necessary to turn V. H. F. knob 35 to U. H. F. digit position 5, corresponding to position 8 in V. H. F. In other words, to go from channel 23 to higher channel 25 in my novel tuner, it is necessary to turn V H. F. knob 35 in the clockwise direction for this particular embodiment.

Similar operation of V. H. F. knob 35 will be necessary for tuning U. H. F. channels between 14 and 49, inclusive, since at these channels the frequency of oscillation of oscillator 62 is higher than that of the incoming U. H. F. signals.

It is evident from the above that no second harmonic interference will be possible with this system since, taking channel 23 for example having a frequency of 524–530, the U. H. F. oscillator 62 oscillates at 662 megacycles and its second harmonic is 1324 megacycles. Mixing the second harmonic (1324 megacycles) with the incoming U. H. F. signal 524–530 produces signals having frequencies between 800 and 806 megacycles considerably above the V. H. F. value of 174–180 megacycles so that effectively no second harmonic interference will be present in the picture of cathode ray tube 26.

To operate U. H. F. oscillator 62 at relatively low frequencies, when higher U. H. F. channels are desired, I make U. H. F. oscillator 62 oscillate at frequencies lower than those of the incoming signals If, for example, channel 65 is desired, U. H. F. knob 43 is first turned to position 6, then the V. H. F. knob 35 to U. H. F. digit position 5 corresponding to position 9 in V. H. F. Should channel 67 be desired, V. H. F. knob 35 must be rotated to U H. F. digit position 7 corresponding to position 11 in V. H. F. In other words, knob 35 would have to be rotated counterclockwise to go from channel 65 to channel 67 in a direction opposite to the one necessary for tuning from channel 23 to channel 25.

It is now evident that a very special type of V. H. F.–U. H. F. knob system will be required to perform the above functions.

My novel knob, Figure 1 and Figures 5, 6, 7 and 8, consists essentially of a U. H. F. mask 43 having nine openings of which five, numbered 77, are on a circle 80 of large diameter, three numbered 78 are on a circle 81 of intermediate diameter, and one numbered 79 is on a circle 82 of small diameter.

Mask 43 is preferably a plastic molding having numbers from 1 to 8 corresponding to the U. H. F. bands branded or in any other way applied to the left-hand side of openings 77 and 78, the right-hand side being free. Openings 77 correspond to U. H. F. bands 1 to 5, inclusive (oscillator frequency higher than the frequency of the incoming U. H. F. signals) while openings 78 correspond to U. H. F. channels 6 to 8, inclusive (oscillator frequency lower than that of the incoming U. H. F. signals).

Opening 79 does not carry any number and through it appear the V. H. F. channel numbers as described hereinafter.

Behind mask 43 in the uppermost position is indicating lamp 85, the light from which is so screened that it can pass beyond mask 43 only when one of the openings 77, 78 or 79 is directly opposite lamp 85.

Mask 43 may be mounted on shaft 40 in any suitable way. On mask 43 is mounted for rotation with shaft 36 of U. H. F. turret 10 V. H. F. plate knob 35 shaped like a frustrated hollow cone and having three sets of openings positioned on three circles 90, 91, 92, having the same radius as the circles 80, 81 and 82 of the U. H. F. mask 43. On circle 90 are openings 97; on circle 91 openings 98 and on circle 92 V. H. F. channel numbers 2 to 13.

Openings 97 have on the right-hand side branded digits from 0 to 9 where 0 corresponds to V. H. F. channel 13 and 9 to V. H. F. channel 6A (located between 6 and 7 and having a frequency of 156–162 megacycles). To go from one U. H. F. channel to a higher one in the same band, 1, 2, 3, 4, or 5, it is then necessary to turn knob 35 counterclockwise.

Openings 98 have on the right-hand side branded digits from 0 to 9 where 0 corresponds to V. H. F. channel 6A and 9 to V. H. F. channel 13. To go from one U. H. F channel to a higher one in the same band 6, 7 or 8, it is then necessary to turn knob 35 clockwise Knob 35 is turned clockwise also when V. H. F. channels 2 to 13 are desired.

A third knob 100 is positioned on knob 35 and secured to rotate shaft 101 of dielectric 102 of the fine tuning capacitor 104.

Actually, V. H. F. knob 35 is provided with a bar shaped member 106 secured to V. H. F. knob 35 by means of screws 107 or any other suitable means and keyed by means of key 108 to shaft 36 of V. H. F. turret 10.

The addition of bar member 106 makes rotation of V. H. F. turret 10 easier because of the considerably larger gripping area provided by the addition of bar member 106. Member 106 has a cylindrical opening 109 housing a portion of fine tuning cylindrical knob 100.

Referring now to Figure 5 showing my novel knob system 35—43 positioned at U. H. F. channel 23, it can there be seen that opening 77 carrying at the left-hand side the branded number 2 is now exactly in front of lamp 85 so that light from lamp 85 will pass through opening 77.

It will also be seen that at the same time the digit number 3 branded on the right-hand side of one of the openings 97 appears aligned with the previously mentioned opening 77 so that the branded number 3 now appears in the free space of opening 77 of mask 43. At the same time the free space in opening 97 will permit the appearance of decade number 2.

The operator, in other words, will now see the decade number 2 on mask 43 and the digit number 3 of knob 35 and since numbers 2 of mask 43 and 3 of knob 35 are both branded and lamp 85 is positioned behind them, the operator will have a lighted indication of the particular channel selected.

Should the operator desire, for example, channel 25, knob 35 will have to be rotated by two positions until the number 5 positioned on outer ring 90 of knob 35 appears on the right-hand side of opening 77 near the decade number 2.

As previously mentioned, the motion of knob 35 to go from channel 23 to channel 25 will be counterclockwise in this particular embodiment.

Referring next to Figure 6 showing my novel knob 35—43 positioned at U. H. F. channel 65, it will be seen there that now opening 78 of mask 43 is opposite to lamp 85. This particular opening 78 carries at the left-hand side a number 6 corresponding to the particular U. H. F. band selected.

Appearing over the free space of opening 78 is digit 5 of opening 98 located in the intermediate circumference 91 of knob 35. The operator will then be able to see the decade number 6 of mask 43 appearing through the free space of opening 98, while light will be able to pass through free space of opening 78 and impinge on digit 5 branded on knob 35.

If the operator should desire a higher U. H. F. channel, for example 67, knob 35 will only have to be rotated by two positions in the clockwise direction until number 7 appears on the right-hand side of the previously selected decade number 6.

It is thus seen from the above that in this particular embodiment of my novel knob system 35—43, when a higher channel is desired for a particular low U. H. F. band, in other words between channel 14 and channel 59, knob 35 must be rotated counterclockwise.

If, on the other hand, a higher U. H. F. channel is desired in any of the higher U. H. F. bands going from channel 60 to channel 85, V. H. F. knob 35 must be rotated in the clockwise direction.

Referring now to Figure 7 showing my novel knob system 35—43 in the V. H. F. position, it will there be seen that now opening 79 of mask 43 appears opposite to lamp 85.

If, for example, V. H. F. channel 4 is desired, the V. H. F. mask is rotated until the particular digit 4 branded on the inner circumference 92 of knob 35 appears directly in front of opening 79 of mask 43, permitting, therefore, the light from lamp to illuminate branded number 4 on knob 35.

If a higher V. H. F. channel should be desired, knob 35 must be rotated in the clockwise direction. The relative positions of mask 43, knob 35, bar 106 and fine tuning knob 100 may be seen more clearly in the cross-sectional view of my novel system shown in Figure 8.

Going back to Figure 5, it is necessary to point out that mask 43 is secured to its U. H. F. shaft 40 by means of a key (not shown) located in appropriate opening 120 in mask 43.

As previously mentioned, on the other hand, V. H. F. knob 35 is secured to the bar 106 by means of rivets or other suitable means 107 and bar knob 106 is then secured to the V. H. F. shaft 36 means of an appropriate key 108 located in bar knob 106. Similarly, fine tuning knob 100 is secured to fine tuning shaft 101 by means of a screw or other keying element 121.

If instead of using a U. H. F. oscillator 62 which oscillates at frequencies higher than that of the incoming television signals between channels 14 and 59 and oscillates at a frequency lower than that of the incoming television signal for channels located between channel 60 and channel 84, a U. H. F. oscillator 62 is used which operates always at a frequency higher than that of the incoming television signals from channel 14 to channel 84, it then becomes unnecessary to have three sets of openings 97, 98 and 99 as shown in Figure 5 or 6 since then my novel knob system will take the shape shown in Figure 9 where now mask 143 is only provided with two sets of openings, one 145 located on relatively large diameter circle 146, the other 148 located on a relatively smaller diameter circle 149.

Openings 145 are provided on the left-hand side of each individual opening with decade numbers going from 1 to 8 while opening 148 is just free space. Corresponding to openings 145 and 148 on mask 143 are similarly shaped openings 150 and 151 on V. H. F. knob 135. Openings 150 and 151 are located on circumferences having the same radii as the circumferences 146 and 149 of U. H. F. mask 143. Openings 150 are provided on the right-hand side of each individual opening 150 with digit numbers going from 0 to 9, while openings 151 are provided with numbers going from 2 to 13.

When knob 135 is positioned above mask 143 in a manner similar to that shown in Figure 8, when a U. H. F. channel is desired, U. H. F. opening 145 will be positioned directly in front of indicating lamp 85 and the operator will see the desired channel number appearing on the U. H. F. knob system 35—43 as previously described.

In V. H. F. reception, opening 148 will be directly in front of lamp 85, thus permitting the elimination of one of the numbers 2 to 13 branded on openings 151 of knob 135.

Referring finally to Figure 10 showing another embodiment of my novel knob system, it is there seen that on U. H. F. shaft 40 is mounted a spider knob 150 carrying a mask 151. The V. H. F. shaft 36, on the other hand, carries a partly conical member 153 having openings similar to those described in connection with Figures 5 and 8 for the U. H. F. mask 43.

The operation of knobs 150 and 153 is essentially the same as that of the knobs shown in Figures 5, 6, 7 and 8, the only difference being in the fact that the U. H. F. mask 151 is now above the V. H. F. knob 35 while exactly the opposite position was occupied by knobs 43 and 35 in the embodiment shown in Figures 5, 6, 7 and 8.

In the foregoing I have described my invention solely in connection with specific illustrative embodiments thereof. Since many variations and modifications of my invention will now be obvious to those skilled in the art, I prefer to be bound not by the specific disclosures herein contained but only by the appended claims.

I claim:

1. In a U. H. F.–V. H. F. tuner comprising a U. H. F. turret and a V. H. F. turret, means for converting U. H. F. signals into V. H. F. signals in cooperation with said U. H. F. turret at U. H. F. reception, switching means sending said V. H. F. signals into said V. H. F. turret for converting said V. H. F. signals into I. F. signals, said U. H. F. and V. H. F. converting means comprising an oscillator and a mixer connected to the output of said oscillator, tuned circuits connected to the input of said mixer to selectively pass the desired U. H. F. signals, said U. H. F. oscillator being provided with selectively connectable circuit components mounted on said U. H. F. turret, said U. H. F. oscillator operating above the frequency of the incoming U. H. F. signals for one band of incoming U. H. F. signals and below the frequency of the incoming U. H. F. signals for the other group of incoming U. H. F. signals, a hollow shaft for rotating said U. H. F. turret, a second shaft for rotating said V. H. F. turret and passing through said hollow shaft, manual means connected to each of said shafts for rotating said U. H. F. and said V. H. F. turrets, said manual means comprising a mask provided with three sets of openings, each of said sets being located on said mask at a different distance with respect to the center of said mask, said mask being releasably mounted on said hollow U. H. F. shaft.

2. In a U. H. F.–V. H. F. tuner comprising a U. H. F. turret and a V. H. F. turret, means for converting U. H. F. signals into V. H. F. signals in cooperation with said U. H. F. turret at U. H. F. reception, switching means sending said V. H. F. signals into said V. H. F. turret for converting said V. H. F. signals into I. F. signals, said U. H. F. and V. H. F. converting means comprising an oscillator and a mixer connected to the output of said oscillator, tuned circuits connected to the input of said mixer to selectively pass the desired U. H. F. signals, said U. H. F. oscillator being provided with selectively connectable circuit components mounted on said U. H. F. turret, said U. H. F. oscillator operating above the frequency of the incoming U. H. F. signals for one band of incoming U. H. F. signals and below the frequency of the incoming U. H. F. signals for the other group of incoming U. H. F. signals, a hollow shaft for rotating said U. H. F. turret, a second shaft for rotating said V. H. F. turret and passing through said hollow shaft, manual means connected to each of said shafts for rotating said U. H. F. and said V. H. F. turrets, said manual means comprising a mask provided with three sets of openings, each of said sets being located on said mask at a different distance with respect to the center of said mask, said mask being releasably mounted on said hollow U. H. F. shaft, a knob provided with three sets of numbers positioned on said knob in alignment with the openings on said mask, a light emitting device mounted near said mask on the side of said mask opposite to that of said knob, the light from said lighting device passing through only one of said openings to illuminate the corresponding number on said knob.

3. In a U. H. F.–V. H. F. tuner comprising a U. H. F. turret and a V. H. F. turret, means for converting U. H. F. signals into V. H. F. signals in cooperation with said U. H. F. turret at U. H. F. reception, switching means sending said V. H. F. signals into said V. H. F. turret for converting said V. H. F. signals into I. F. signals, said U. H. F. and V. H. F. converting means comprising an oscillator and a mixer connected to the output of said oscillator, tuned circuits connected to the input of said mixer to selectively pass the desired U. H. F. signals, said U. H. F. oscillator being provided with selectively connectable circuit components mounted on said U. H. F. turret, said U. H. F. oscillator operating above the frequency of the incoming U. H. F. signals for one band of incoming U. H. F. signals and below the frequency of the incoming U. H. F. signals for the other group of incoming U. H. F. signals, a hollow shaft for rotating said U. H. F. turret, a second shaft for rotating said V. H. F. turret and passing through said hollow shaft, manual means connected to each of said shafts for rotating said U. H. F. and said V. H. F. turrets, said manual means comprising a mask provided with three sets of openings, each of said sets being located on said mask at a different distance with respect to the center of said mask, transparent members carrying sequential numbers mounted partially on each opening of two of said sets, said mask being releasably mounted on said hollow U. H. F. shaft.

4. In a U. H. F.–V. H. F. tuner comprising a U. H. F. turret and a V. H. F. turret, means for converting U. H. F. signals into V. H. F. signals in cooperation with said U. H. F. turret at U. H. F. reception, switching means sending said V. H. F. signals into said V. H. F. turret for converting said V. H. F. signals into I. F. signals, said U. H. F. and V. H. F. converting means comprising an oscillator and a mixer connected to the output of said oscillator, tuned circuits connected to the input of said mixer to selectively pass the desired U. H. F. signals, said U. H. F. oscillator being provided with selectively connectable circuit components mounted on said U. H. F. turret, said U. H. F. oscillator operating above the frequency of the incoming U. H. F. signals for one band of incoming U. H. F. signals and below the frequency of the incoming U. H. F. signals for the other group of incoming U. H. F. signals, a hollow shaft for rotating said U. H. F. turret, a second shaft for rotating said V. H. F. turret and passing through said hollow shaft, manual means connected to each of said shafts for rotating said U. H. F. and said V. H. F. turrets, said manual means comprising a mask provided with three sets of openings, each of said sets being located on said mask at a different distance with respect to the center of said mask, transparent members carrying sequential numbers mounted partially on each opening of two of said sets, said mask being releasably mounted on said hollow U. H. F. shaft, a knob provided with three sets of numbers positioned on said knob in alignment with the openings on said mask, a light emitting device mounted near said mask on the side of said mask opposite to that of said knob, the light from said lighting device passing through only one of said openings to illuminate the corresponding number on said knob and on said mask.

5. In a U. H. F.–V. H. F. tuner comprising a U. H. F. turret and a V. H. F. turret, means for converting U. H. F. signals into V. H. F. signals in cooperation with said U. H. F. turret at U. H. F. reception, switching means sending said V. H. F. signals into said V. H. F. turret for converting said V. H. F. signals into I. F. signals, said U. H. F. and V. H. F. converting means comprising an oscillator and a mixer connected to the output of said oscillator, tuned circuits connected to the input of said mixer to selectively pass the desired U. H. F. signals, said U. H. F. oscillator being provided with selectively connectable circuit components mounted on said U. H. F. turret, said U. H. F. oscillator operating above the frequency of the incoming U. H. F. signals for one band of incoming U. H. F. signals and below the frequency of the incoming U. H. F. signals for the other group of incoming U. H. F. signals, a hollow shaft for rotating said U. H. F. turret, a second shaft for rotating said V. H. F. turret and passing through said hollow shaft, manual means connected to each of said shafts for rotating said U. H. F. and said V. H. F. turrets, said manual means comprising a mask provided with three sets of openings, each of said sets being located on said mask at a different distance with respect to the center of said mask, transparent members carrying sequential numbers mounted partially on each opening of two of said sets, said mask being releasably mounted on said hollow U. H. F. shaft, a knob provided with three sets of numbers positioned on said knob in alignment with the openings on said mask, a light emitting device mounted near said mask on the side of said mask opposite to that of said knob, the light from said lighting device passing through only one of said openings to illuminate the corresponding number on said knob and on said mask, said numbers on said mask corresponding to the decade numbers of U. H. F. channels and said numbers of two of said sets on said knob corresponding to digits of U. H. F. channels.

6. In a U. H. F.–V. H. F. tuner comprising a U. H. F. turret and a V. H. F. turret, means for converting U. H. F. signals into V. H. F. signals in cooperation with said U. H. F. turret at U. H. F. reception, switching means sending said V. H. F. signals into said V. H. F. turret for converting said V. H. F. signals into I. F. signals, said U. H. F. and V. H. F. converting means comprising an oscillator and a mixer connected to the output of said oscillator, tuned circuits connected to the input of said mixer to selectively pass the desired U. H. F. signals, said U. H. F. oscillator being provided with selectively connectable circuit components mounted on said U. H. F. turret, said U. H. F. oscillator operating above the frequency of the incoming U. H. F. signals for one band of incoming U. H. F. signals and below the frequency of the incoming U. H. F. signals for the other group of incoming U. H. F. signals, a hollow shaft for rotating said U. H. F. turret, a second shaft for rotating said V. H. F. turret and passing through said hollow shaft, manual means connected to each of said shafts for rotating said U. H. F. and said V. H. F. turrets, said manual means comprising a mask provided with three sets of openings, each of said sets being located on said mask at a different distance with respect to the center of said mask, transparent members carrying sequential numbers mounted partially on each opening of two of said sets, said mask being releasably mounted on said hollow U. H. F. shaft, a knob provided with three sets of numbers positioned on said knob in alignment with the openings on said mask, a light emitting device mounted near said mask on the side of said mask opposite to that of said knob, the light from said lighting device passing through only one of said openings to illuminate the corresponding number on said knob and on said mask, said numbers on said mask corresponding to the decade numbers of U. H. F. channels and said numbers of two of said sets on said knob corresponding to digits of U. H. F. channels, one set of said numbers on said knob being in increasing order at counterclockwise rotation of said knob.

7. In a U. H. F.–V. H. F. tuned comprising a U. H. F. turret and a V. H. F. turret, means for converting U. H. F. signals into V. H. F. signals in cooperation with said U. H. F. turret at U. H. F. reception, switching means sending said V. H. F. signals into said V. H. F. turret for converting said V. H. F. signals into I. F. signals, said U. H. F. and V. H. F. converting means comprising an oscillator and a mixer connected to the output of said oscillator, tuned circuits connected to the input of said mixer to selectively pass the desired U. H. F. signals, said U. H. F. oscillator being provided with selectively connectable circuit components mounted on said U. H. F. turret, said U. H. F. oscillator operating above the frequency of the incoming U. H. F. signals, panels mounted on said U. H. F. turret, said circuit components being mounted on said panels, a hollow shaft for rotating said U. H. F. turret, a second shaft for rotating said V. H. F. turret and extending through said hollow shaft, manual means for operating said shaft and causing the rotation of said turrets, said manual means comprising a mask provided with three sets of openings, said mask being mounted on said hollow shaft, number carrying members being mounted partially on said openings, a knob mounted on said second shaft, said knob being provided with three sets of numbers in alignment with the said three sets of openings on said mask, a lighting device for lighting the combination of said numbers on said mask and on said knob.

8. In a U. H. F.–V. H. F. tuner comprising a U. H. F. turret and a V. H. F. turret, means for converting U. H. F. signals into V. H. F. signals in cooperation with said U. H. F. turret at U. H. F. reception, switching means sending said V. H. F. signals into said V. H. F. turret for converting said V. H. F. signals into I. F. signals, said U. H. F. and V. H. F. converting means comprising an oscillator and a mixer connected to the output of said oscillator, tuned circuits connected to the input of said mixer to selectively pass the desired U. H. F. signals, said U. H. F. oscillator being provided with selectively connectable circuit components mounted on said U. H. F. turret, said U. H. F. oscillator operating above the frequency of the incoming U. H. F. signals, panels mounted on said U. H. F. turret, said circuit components being mounted on said panels, a hollow shaft for rotating said U. H. F. turret, a second shaft for rotating said V. H. F. turret and extending through said hollow shaft, manual means for operating said shaft and causing the rotation of said turrets, said manual means comprising a mask provided with three sets of openings, said mask being mounted on said hollow shaft, number carrying members being mounted partially on said openings, a knob mounted on said second shaft, said knob being provided with three sets of numbers in alignment with the said three sets of openings on said mask, a lighting device for lighting the combination of said numbers on said mask and on said knob, the rotation of said knob in one direction corresponding to increasing U. H. F. and V. H. F. channels.

References Cited in the file of this patent

UNITED STATES PATENTS

| | | |
|---|---|---|
| 304,936 | Jones | Sept. 9, 1884 |
| 389,782 | Willcox | Sept. 18, 1888 |
| 514,736 | Sloan | Feb. 13, 1894 |
| 2,000,113 | Wheeler | May 7, 1935 |
| 2,245,369 | Smith | June 10, 1941 |
| 2,535,161 | Robbins | Dec. 26, 1950 |
| 2,598,857 | Sziklai | June 3, 1952 |
| 2,665,377 | Krepps | Jan. 5, 1954 |
| 2,772,354 | Browder | Nov. 27, 1956 |